US000001443H

United States Statutory Invention Registration [19]

[11] Reg. Number: H1443

Kim et al.

[43] Published: Jun. 6, 1995

[54] OPTICALLY ACTIVATED MULTI-FREQUENCY HIGH POWER RF GENERATION UTILIZING A WAFER-SCALE SI-GAAS SUBSTRATE

[75] Inventors: Anderson H. Kim, Toms River; Maurice Weiner, Ocean, both of N.J.; Louis J. Jasper, Jr., Fulton, Md.; Thomas E. Koscica, Clark; Robert J. Youmans, Brick, both of N.J.

[73] Assignee: The United States of America as represented by the Secretary of the Army, Washington, D.C.

[21] Appl. No.: 822,453

[22] Filed: Jan. 17, 1992

[51] Int. Cl.[6] ..... F21V 1/00; H01Q 11/10

[52] U.S. Cl. ..... 252/582; 257/86; 343/792.5

[58] Field of Search ..... 343/792.5; 257/86; 252/582

[56] References Cited

U.S. PATENT DOCUMENTS

| | | | |
|---|---|---|---|
| 4,054,886 | 10/1977 | Bergander et al. | 343/792.5 |
| 4,442,590 | 4/1984 | Stockton et al. | 437/201 |
| 4,658,262 | 4/1987 | Du Hamel | 343/792.5 |
| 5,164,738 | 11/1992 | Walter et al. | 343/792.5 |
| 5,212,494 | 5/1993 | Hofer et al. | 343/792.5 |

OTHER PUBLICATIONS

"IRE Wescon Convention Record"; Part I, vol. 2 Antennas Aug. 19–22, 1958.

A. Kim et al., "Monolithic, photoconductive impulse generator using a GaAs wafer", *Applied Physics Letters 58 (24)*, Jun. 17, 1991.

*Primary Examiner*—Shean Wu

*Attorney, Agent, or Firm*—Michael Zelenka; William H. Anderson

[57] ABSTRACT

A device for radiating pulses of radio frequency energy in response to pulses of laser light in which a metal layer is ohmically bonded to one side of a substrate of semiconductor material and an antenna is ohmically bonded to the other side of the substrate, there being at least one aperture in the metal layer for permitting laser light to reach the disk.

3 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICALLY ACTIVATED MULTI-FREQUENCY HIGH POWER RF GENERATION UTILIZING A WAFER-SCALE SI-GAAS SUBSTRATE

GOVERNMENT INTEREST

The invention described herein may be manufactured, used, and licensed by or for the Government for governmental purposes without the payment to us of any royalty thereon.

FIELD OF THE INVENTION

The invention described herein is a device for generating wide band pulses of radio frequency energy.

BACKGROUND OF THE INVENTION

Recently, considerable progress has been made in the generation of high power pulses for application to wide-band impulse transmitters by charging up the semiconductor material of a transmission line and discharging it by rendering the material at an end of the line conductive with a pulsed laser beam. This causes a traveling wave to flow to that end of the line that can be coupled to an antenna. Thus the semiconductor material stores the energy and also acts as a switch. Coaxial and micro-strip lines have been used, but a radial transmission lines produce pulses of higher voltage because the traveling waves converge at its center.

A radial transmission line device and a system for using it to generate radio frequency pulses in response to pulses of laser light is described in an article entitled "Monolithic, photoconductive impulse generator using a GaAs wafer" that was authored by people including the inventors of this invention and which appeared in the Jun. 17, 1991 issue of "Applied Physics Letters 58 (24)".

Various aspects of this known system are shown in FIGS. 1, 2 and 3 wherein a disk 2 of semiconductor material such as GaAs has an annular metal layer 4 ohmically bonded to one surface 5 by n or p doped region 6 of the wafer 2 and an annular metal layer 8 ohmically bonded to the other surface 9 by n or p doped region 10. The central openings of the annular metal layer 4 and the underlying doped region 6 are respectively indicated at 12 and 14. An inner conductor 16 of a coaxial line 18 is ohmically bonded to the lower surface 9 of the disk 2 at the center of the opening 20 in the annular layer 8 by n or p type doped region 22. The outer conductor 24 of the coaxial line 18 is ohmically adhered to the annular metal layer 8 by soldering or the like as indicated at 26.

Generation of RF pulses is achieved by connecting a source 28 of DC charging pulses between the metal layers 8 and 4 and directing much shorter pulses of laser light from a source 30 through the openings 12 and 14. In a matter of nanoseconds, the laser light renders the central portion of the wafer 2 conductive so that the capacitor formed by the wafer 2 and the metal layers 4 and 8 is discharged through a load impedance 32 that is connected between the inner and outer conductors 16 and 24 of the coaxial line 18. This causes RF waves to travel inwardly to the center of the wafer and along the transmission line 18. The load 32 is typically a remotely located antenna.

SUMMARY OF THE INVENTION

In accordance with this invention, an antenna or radiating element is ohmically bonded by an n or p type doped region 10 to the surface or bottom face 9 of the wafer 2 of FIG. 1. Fourier analysis of the output pulses shows that they possess a wide range of frequency components. The antenna is designed to have radiating members for each of a plurality of frequencies contained in the output pulse. Furthermore, the radiating members are arranged so as to transmit waves of the different frequencies that are circularly polarized so as to jam a transmitter regardless of its polarization. The antenna is an integral part of the pulse generator, whereby losses due to transmission and reflections resulting from mismatching are significantly reduced by eliminating the need for a coaxial line. By incorporating the antenna into the wafer, a considerable reduction in size and weight is also achieved.

BRIEF DESCRIPTION OF THE DRAWINGS

The invention is described in detail below with reference to the drawings in which like items are indicated by the same reference designation, wherein.

DETAILED DESCRIPTION

Figure 1:
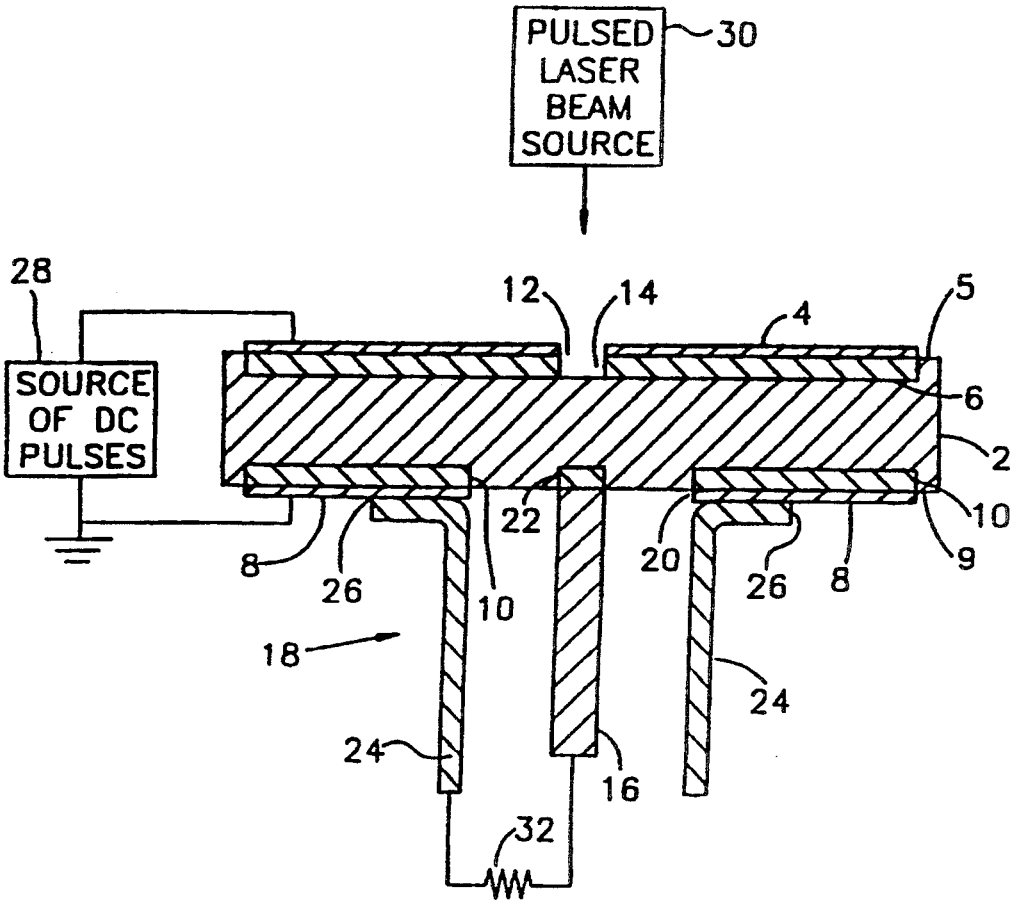
FIG. 1 (Prior Art)
FIG. 1 shows both a transverse diametric cross sectional view of a known laser triggered wafer type disk device for generating radio frequency pulses, and simplified block diagrams of required operating components.
Figure 2:
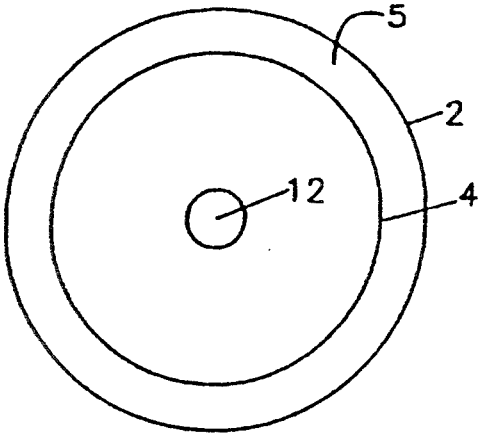
FIG. 2 (Prior Art)
FIG. 2 is a top view of a device having a diametric cross section as depicted in FIG. 1.
Figure 3:
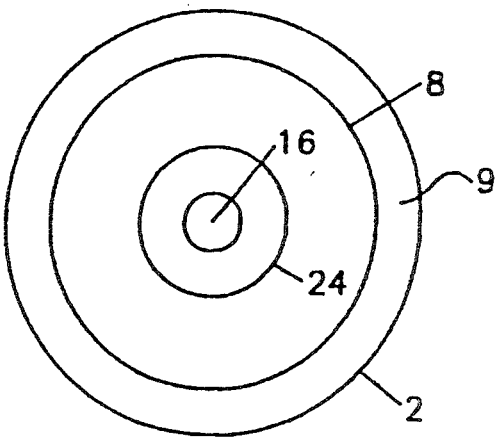
FIG. 3 (Prior Art)
FIG. 3 is a bottom view of a device having a diametric cross section as depicted in FIG. 1.

FIGS. 1, 2 and 3 have been described in the background section.

Figure 4:
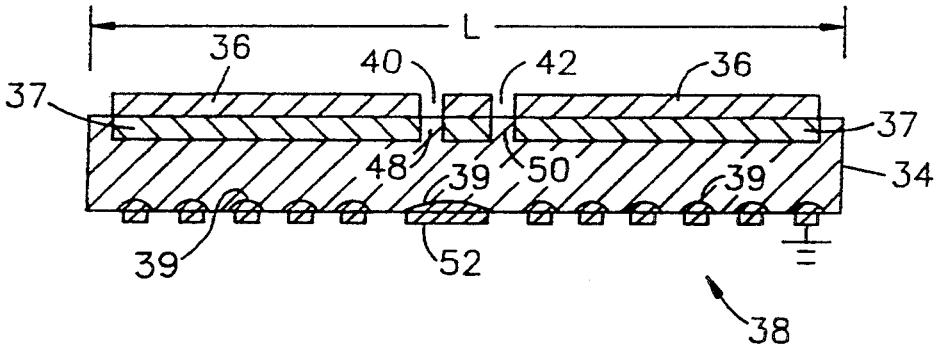
FIG. 4 is a transverse diametric cross section taken along 4—4 of FIG. 5 of a wafer type device of this invention for use in a laser triggered radio frequency pulse generator.
Figure 5:
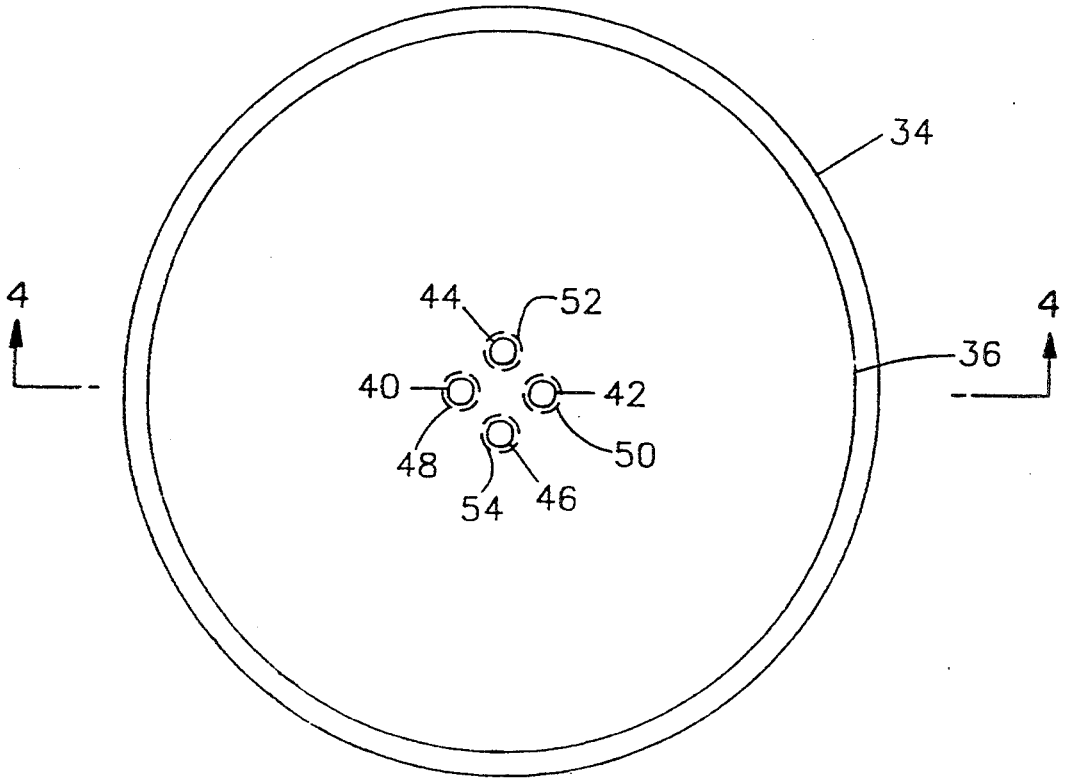
FIG. 5 is a top view of a laser triggered wafer type device of this invention as depicted in FIG. 4.
Figure 6:
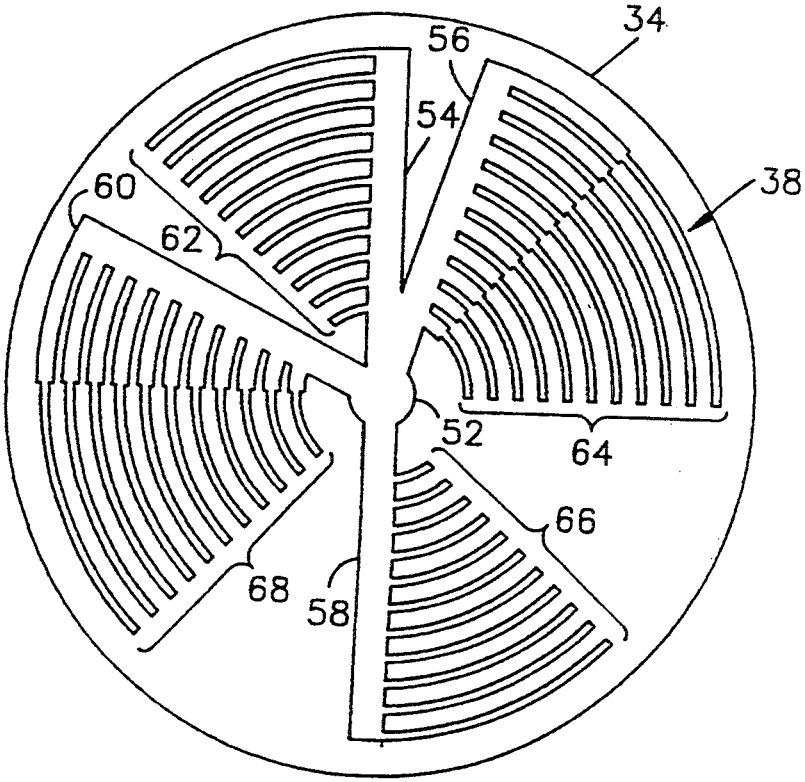
FIG. 6 is a bottom view of a laser triggered wafer type device of this invention having a cross section as depicted in FIG.

FIGS. 4, 5 and 6 respectively illustrate the diametric cross section, top and bottom views of a wafer type device of this invention that is triggered by pulses of laser light so as to produce pulses of RF. A circular wafer 34 of semiconductor material such as GaAs has a metal layer 36 ohmically bonded in any suitable manner to a top face by, for example, n or p doped region 37, and a conductive metal antenna pattern 38 is ohmically bonded to its other side by, for example, n or p type doped regions 39. Note that wafer 34 may be any practical shape, and is not limited to a circular configuration. The metal layer 36 and the antenna pattern 38 may, for example, be formed by a metallizing process. A plurality of apertures, only four of which, 40, 42, 44 and 46, are shown, extend through the layer 36 and respectively communicate with undoped regions 48, 50, 52 and 54 (can be construed as apertures in the doped region 37), respectively, proximate the n or p doped region 37 that ohmically bonds the metal layer 36 to the wafer 34. Only apertures 40, 42, and undoped regions 48 and 50 appear in FIG. 4, whereby undoped regions 52 and 54 underlie apertures 44 and 46, respectively, as indicated in phantom in FIG. 5.

In the particular example of FIG. 6, the antenna pattern 38 is shown as being comprised of a central area 52 to which radial members 54, 56, 58 and 60 are connected. Groups 62, 64, 66 and 68 of spaced arced members are respectively connected to the radial members 54,56, 58 and 60, and the central member 52 is axially aligned with the plurality of apertures 40, 42, 44 and 46 in the metal layer 36.

Figure 7:
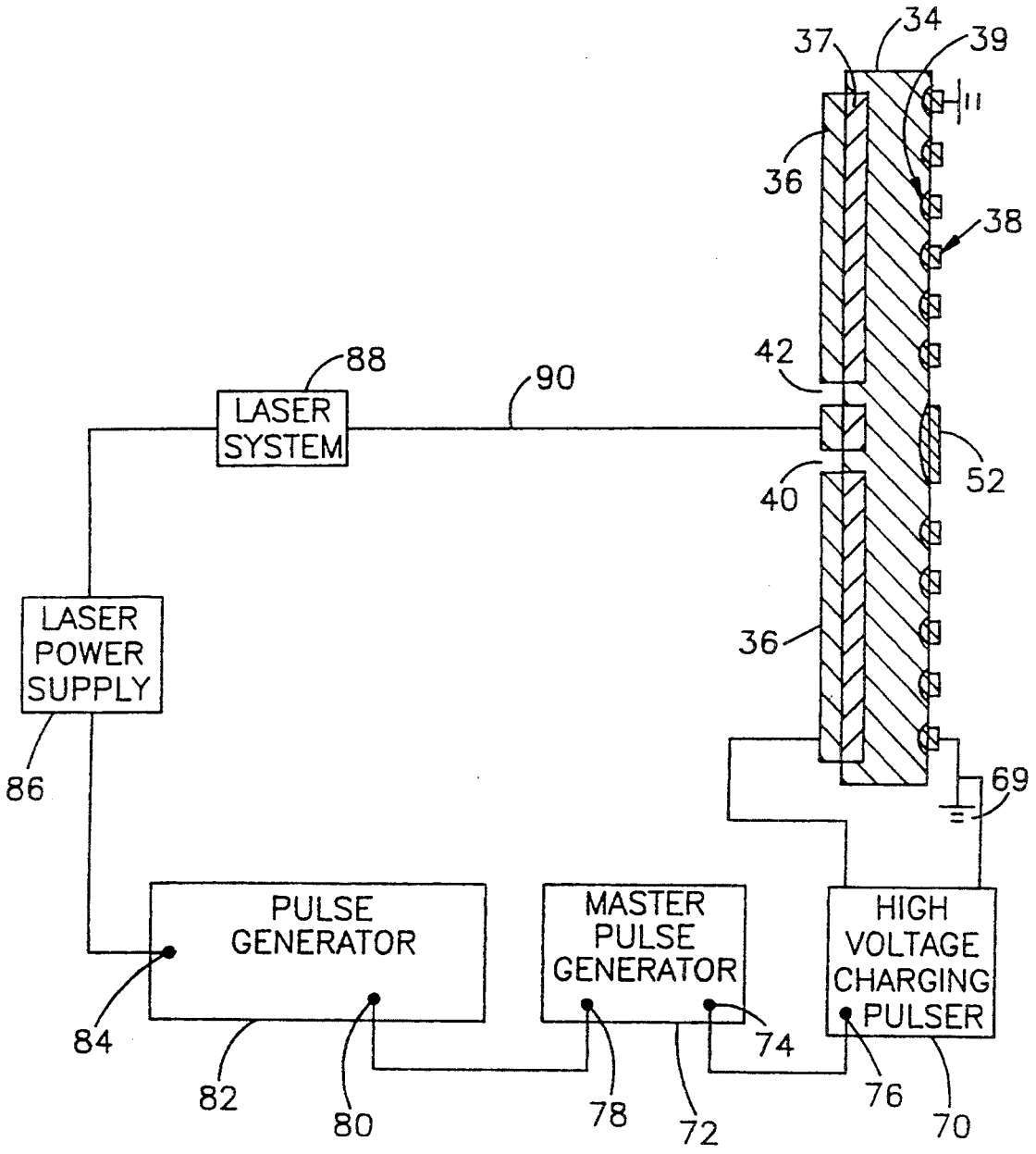
FIG. 7 is a block diagram of a system utilizing a wafer type device of this invention for generating radio frequency pulses.

FIG. 7 illustrates a system incorporating the wafer type device of this invention for generating pulses of RF energy. The various components of the device are designated in the same way as on FIGS. 4, 5 and 6. The antenna pattern 38 is connected to a source 69 of reference potential (ground in this example)at any point, and the output of a high voltage charging pulser 70 (50 to 75 kV, 5.0 μS charge time, manufactured by Signum Electronics, Neptune, N.J., in this example) is coupled between the source 69 of reference potential and the metal layer 36. A master pulse generator 72, which may be a Hewlett Packard "Model 214 B" (manufactured by Hewlett-Packard, Palo Alto, CA) supplies pulses at its charging pulse output 74 to the input 76 of the charging pulser 70. A trigger output 78 of the master pulse generator 72 supplies pulses that are delayed with respect to the charging pulses to a trigger pulse input 80 of a pulse generator 82, which may also be a Hewlett Packard Model 214 B, for example, and its pulse output 84 is coupled to a laser power supply 86. A laser system 88, which preferably includes an array of laser diodes (for example, an "LTD 350 LED" array, manufactured by Laser Diode Corp., New Brunswick, N.J.), is coupled to the power supply 86, and a bundle 90 of fiber optic lines respectively conduct the pulses of laser light from the diodes of the array to the apertures such as 40, 42, 44 and 46 in the center of the metal sheet 36. Only apertures 40 and 42 are visible in this view.

Figure 8:
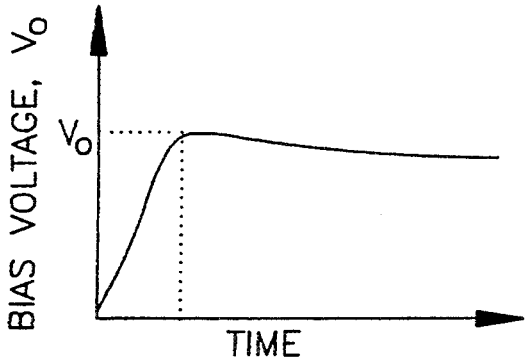
FIG. 8 is a graphical representation of the charging characteristics of a wafer type device of this invention.
Figure 9:
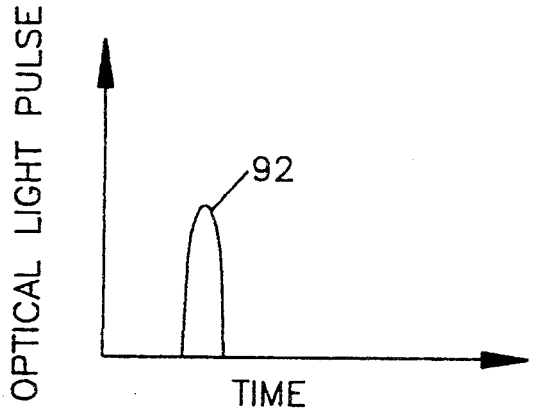
FIG. 9 is a graphical representation of the pulse of laser light used to trigger a wafer type device of this invention.
Figure 10:
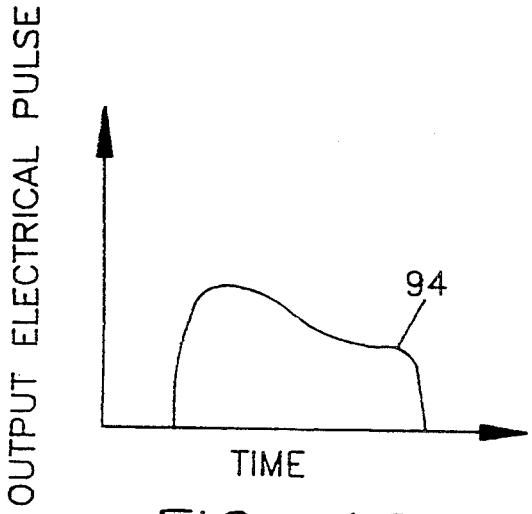
FIG. 10 is a graphical representation of an output radio frequency pulse that is produced by a wafer type device of this invention.

The time represented by the abscissas of FIGS. 8, 9 and 10 have respective scales of hundreds of microseconds, nanoseconds and hundreds of nanoseconds. FIG. 8 is a graph illustrating the charging of the capacitance between the metal layer 36 and the metal antenna pattern 38 up to a voltage of $V_o$. After the voltage $V_o$ is attained, a pulse 92 of laser light, FIG. 9, that has a width of preferably less than 40 ns, is emitted by the laser system 88 so as to render the central portion of the semiconductor wafer 34 conductive. This discharges the capacitance between the layer 36 and the antenna 38 so as to produce an output pulse 94 such as indicated in FIG. 9. The duration of this output pulse 94 is only a few hundred nanoseconds so that it contains frequencies in a range from several hundred megahertz to several gigahertz. The radial positions of the arc-shaped conductors in the groups 62, 64, 66 and 68 is such that they radiate respective frequencies within the range of frequencies referred to above. An array of devices illustrated by FIGS. 4, 5 and 6 may be used so as to attain the desired amount of RF power.

In a wafer type device of this invention, there is no need for a coaxial line such as the coaxial line 18 of FIG. 1 for conducting the output pulses of the device to a remote antenna (not shown) because the antenna 38 is an integral part of the present device. In the known device of FIG. 1, the resistor 32 represents the load of an antenna, and RF waves flow from the center 22 of the under surface 9 to the annular metal layer 8 via the inner conductor 16, the load 32 and the outer conductor 24. However, in the device of this invention, the RF waves flow from the central area 52 to the groups 62, 64, 66 and 68 of the antenna members or radiating elements that occupy substantially the same position as the annular metal layer 8 of FIG. 1. In a system utilizing an array of devices of this invention, the elimination of the coaxial lines reduces the significant losses that such lines would have and greatly simplifies the construction.

Although various embodiments of the invention have been described and shown herein, they are not meant to be limiting. Those of skill in the art may recognize certain modifications to these embodiments, which modifications are meant to be covered by the spirit and scope of the appended claims.

What is claimed is:

1. A method for providing a high power multi-frequency wafer-scale optically activated RF generated device from a silicon GaAs substrate, said method comprising the steps of:

forming a first metallization layer on a top face of said substrate;

forming at least one aperture through a central portion of said first metallization layer, for permitting light to pass through said one aperture to said substrate;

forming a second metallization layer on a bottom surface of said substrate, said second metallization layer having a pattern for providing an antenna;

forming the pattern of said antenna to both have a central portion opposing and aligned with said at least one aperture in said first metallization layer and a plurality of spaced apart groups of elements, projecting away from said central portion for respectively radiating different frequencies of radio frequency energy; and forming said elements to each have an arc shape for emitting a pattern of circularly polarized radio frequency waves when energized.

2. The method of claim 1, further including the step of:

forming each of said groups of elements to have elements of differing lengths relative to other elements.

3. The method of claim 2, further including the step of:

applying high voltage pulses across said first and second metallization layers, for a sufficient time to charge said substrate to a relatively high voltage; and periodically applying a pulsed laser beam to said at least one aperture in a manner for periodically discharging said substrate into said antenna, for radiating therefrom multi-frequency RF energy.

* * * * *